March 8, 1966    H. L. HOYT    3,238,761
MACHINE FOR FORMING METAL ARTICLES
Filed March 7, 1963    4 Sheets-Sheet 1

March 8, 1966 H. L. HOYT 3,238,761
MACHINE FOR FORMING METAL ARTICLES
Filed March 7, 1963 4 Sheets-Sheet 3

INVENTOR
Herbert L. Hoyt
BY Spencer, Rockwell & Bartholow
ATTORNEYS

March 8, 1966   H. L. HOYT   3,238,761
MACHINE FOR FORMING METAL ARTICLES
Filed March 7, 1963   4 Sheets-Sheet 4

INVENTOR
Herbert L. Hoyt
BY Spencer, Rockwell & Bartholow
ATTORNEYS

3,238,761
MACHINE FOR FORMING METAL ARTICLES
Herbert L. Hoyt, Waterbury, Conn., assignor to Textron Inc., Providence, R.I., a corporation of Rhode Island
Filed Mar. 7, 1963, Ser. No. 263,645
9 Claims. (Cl. 72—345)

This application is a continuation-in-part of an earlier-filed copending application, Serial Number 7,703, filed February 9, 1960, and now Patent No. 3,112,660.

This invention relates to an apparatus for forming metal articles and particularly an article provided with a stem or shank and a head of relatively large cross-sectional size with respect to the shank or with respect to at least a part of the shank. It will be understood, however, that the features of the invention claimed herein are not limited to use with a device of this particular type.

As illustrated, the mechanism comprises a die block carried by a machine frame. A pair of dies are provided in the die block and a gate is slidably mounted on the frame, which gate carries tools to cooperate with the dies. In addition to the working dies, the die block is provided with a cut-off die through which a length of stock is fed for a blank or workpiece to be cut therefrom, and means are provided to cut off a workpiece from the stock and transfer it to the first processing die on the die bed. The first die is an extruding die in which a portion of the workpiece is extruded so as to reduce its cross-sectional size. The workpiece is then ejected from the extruding die and transferred to the second processing die which is a heading die in which the unextruded larger end portion of the blank is formed into a head. The machine is provided with a single heading die and a single heading punch so that the heading process is performed in a single operation.

The present invention is directed to means for ejecting the blanks from the extruding and heading dies. The means are actuated by an operating arm controlled by a shaft which is driven from the main crankshaft of the machine. Thus, both of the ejecting mechanisms are actuated by the same means and, therefore, may be readily timed to act in unison.

A primary object of the invention is to provide new and improved means for ejecting a workpiece from one or more of the processing or die stations of a header or like machine.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which.

Figure 1:
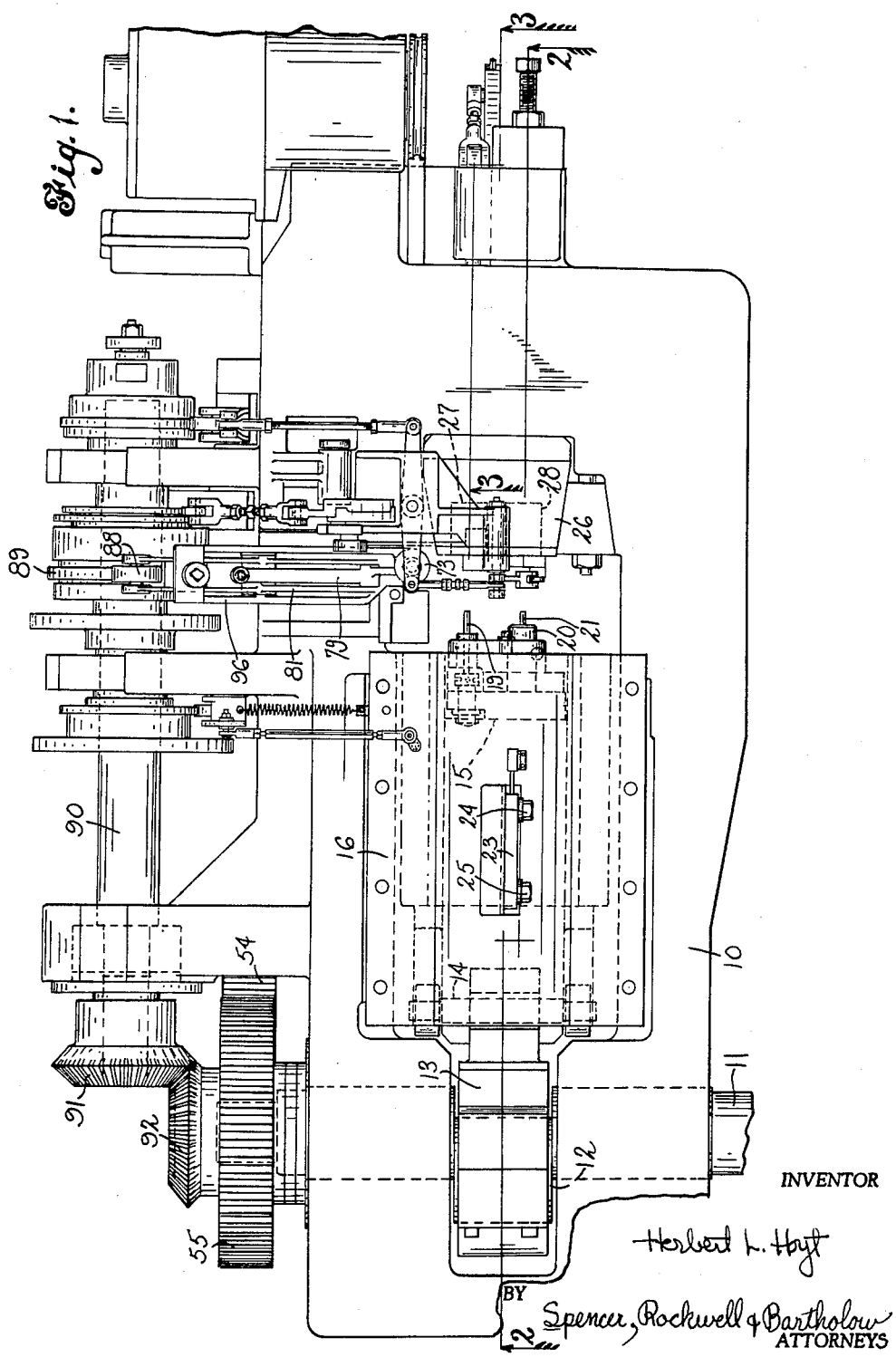
FIG. 1 is a top plan view of a header or like mechanism embodying the invention.
Figure 2:
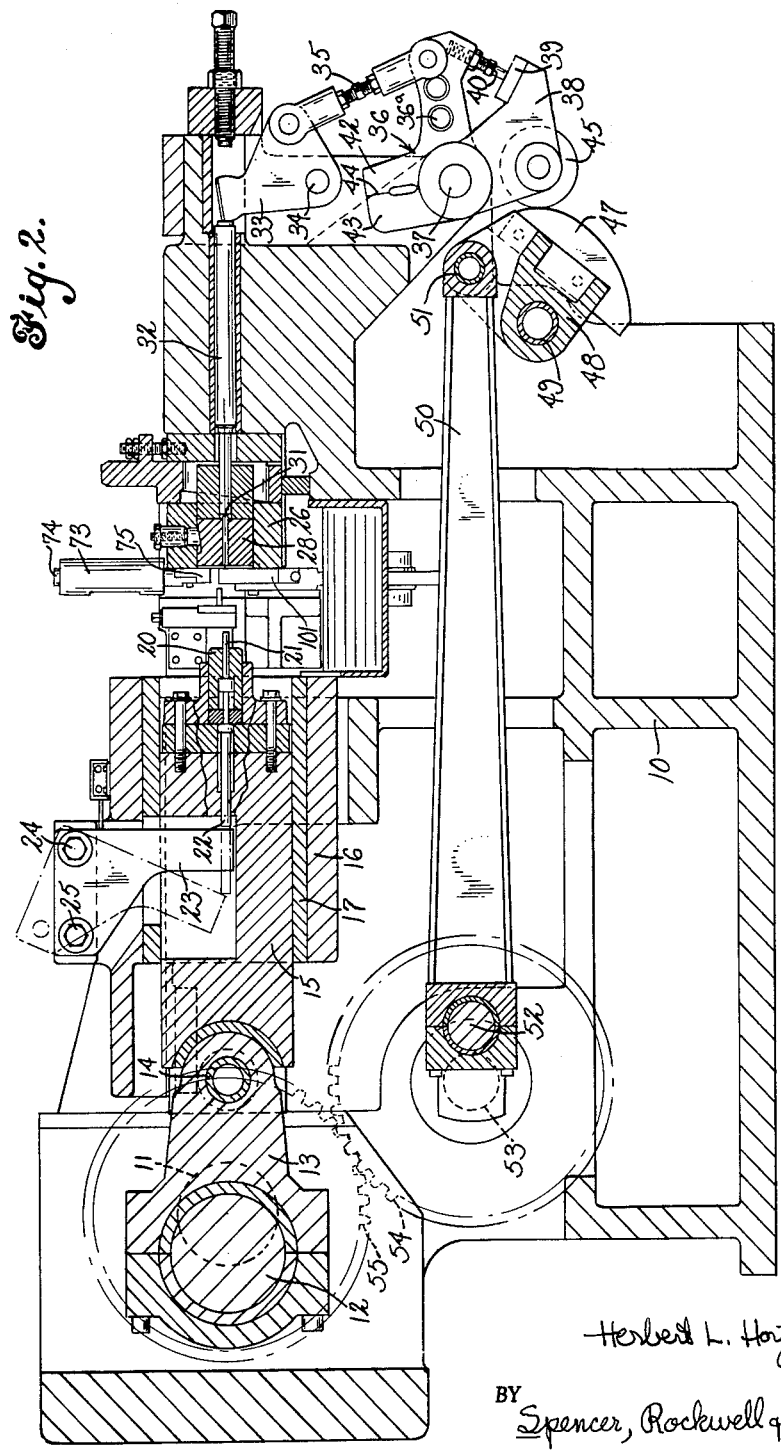
FIG. 2 is a longitudinal sectional view taken along line 2—2 of FIG. 1.

Referring now to FIGS. 1 and 2, there is shown an apparatus comprising a supporting frame 10 in which is mounted a main crankshaft 11 having a crank portion 12 thereon. This shaft may be driven from any suitable driving means (not shown). Upon the crank portion 12 is a pitman 13 connected by a crank pin 14 to a ram or gate 15 of cylindrical form. This ram is slidably mounted within a housing 16 mounted upon the frame and is embraced by a bearing sleeve 17 mounted within the housing.

At the forward face of the gate or ram are secured an extruding punch 19 and a heading punch 20, the latter being shown in section in FIG. 2. It is provided with an ejecting or blank-stripping pin 21 engaged at its rear end by a knock-out rod 22. The rear end of this rod is adapted to engage an abutment 23 secured to the housing 16 so that when the ram is withdrawn rearwardly or toward the left in FIG. 2, the rod 22 will strike the abutment 23 and the ejecting pin 21 would be advanced to strip the work from the punch if it clings thereto. The abutment 23 is secured to the housing by bolts 24 and 25, and the latter may be made of frangible material so as to be fractured if excessive pressure is applied thereto.

A die block 26 is mounted on the frame and is provided with dies 27 and 28 to cooperate with the extruding and heading punches respectively. Also a cut-off die (not shown) is mounted in a portion of the die block 26 and is provided with an opening through which the length of stock is fed for the workpieces or blanks to be cut therefrom.

As shown in FIG. 2, an ejecting pin 31 is mounted in the opening of the die 28, this pin being driven forwardly by the knock-out rod 32. This knock-out rod is advanced by a lever 33 pivoted at 34 to the frame and adjustably connected by an adjustable link 35 to a lever 36 pivoted to the frame at 37.

A second lever 38 is also pivoted to the frame at 37, and this lever carries a frangible plate 39 against which bears a pin 40 adjustably threaded into the lever 36. The levers 36 and 38 are provided with extended ends 42 and 43 respectively which abut at 44 so that upon adjustment of the pin 40 these levers are rigidly connected together. The frangible plate 39 will be fractured if excessive pressure is applied thereto and break the connection between the levers in the direction of movement to advance the pin 32 if the latter meets with excessive resistance.

The lever 38 carries a cam roller 45 which bears upon a cam 47 carried by a rocker member 48 pivoted to the frame at 49. A pitman 50 is pivoted to the rocker member at 51, and at its other end is pivoted to the crank portion 52 of a crankshaft 53. A gear 54 is secured to this shaft, the teeth of which mesh with a gear 55 (FIGS. 1 and 2) carried by the shaft 11. It may here be noted that the arm 36 is provided with a plurality of openings 36a for the adjustable connection thereto of the link 35 so that the throw of the lever 33 may be adjusted.

Figure 3:
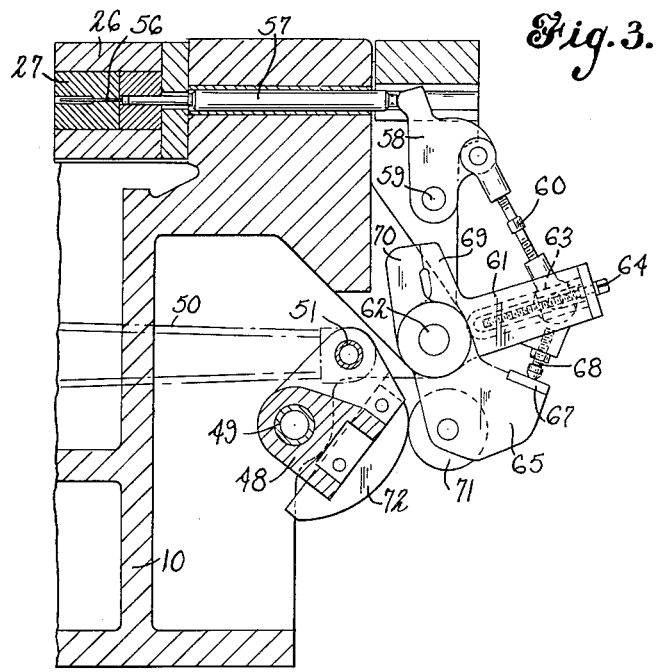
FIG. 3 is a partial longitudinal sectional view taken along line 3—3 of FIG. 1.

As shown in FIG. 3, an ejecting pin 56 is also provided in extruding die 27 and is slidably mounted therein. The ejecting pin is advanced forwardly in a direction to eject a workpiece from the die by the knock-out rod 57. This knock-out rod is advanced by the lever 58 pivoted to the frame at 59 and adjustably connected by the link 60 to one arm 61 of a lever pivoted on frame 62. The end of link 60 may be adjustably connected to the arm 61 by means of a slot 63 in the latter and an adjusting screw 64 rotatably mounted in the arm 61. In this manner the throw of lever 58 may be adjusted.

A second lever 65 is also pivotally connected to the frame at the pivot 62, this lever being provided with a breaker plate 67 of frangible material against which bears the head of a screw 68 adjustably threaded into the arm 61. As is the case with the knock-out of the heading die the levers 61 and 65 are provided with abutting end portions 69 and 70 so that these two levers will ordinarily be rigidly connected.

The lever arm 65 carries a cam follower roller 71 adapted to be engaged by a cam 72 also carried by the rocker member 48 pivoted to the frame at 49 as previously described. Thus the knock-out or ejector mechanism for both the extruding die and the heading die are actuated from the rocker member 48 which in turn is actuated by the pitman 52 although, as indicated, separate cams 47 and 72 are provided for these members. They may be actuated from the same cam if desired.

The rod or wire stock from which the workpieces are cut may be advanced by any suitable feeding means through an opening in the cut-off die, and means are provided at the face of this die for cutting a workpiece therefrom. Secured to the frame is a sleeve 73 in which is reciprocably mounted a rod 74 carrying a cut-off member 75 at its lower end. This rod is provided with a recess in which is received the nose of a lever 79 pivoted to a second lever 81, the second lever being in turn pivoted to the machine frame.

Upon the remote end of lever 81 is a cam follower roller 88 adapted to be engaged by a cam 89 secured to a shaft 90 which is driven by bevelled gears 91 and 92 from the crankshaft 11. The means for actuating cut-off member 75 are more fully described in the aforementioned co-pending application. It will be seen that the movement of the cut-off member is controlled by the configuration of the cam 89.

Cooperating with the cut-off member 75 is a severing member secured to the upper end of a lever 101. The severing member and lever are so constructed and arranged that the severing member will grip the workpiece after it has been severed from the length of stock to carry the workpiece to the adjacent extruding die 27. Since the severing and transferring mechanism form no part of the invention herein and are fully desecribed in the aforementioned application, no further description herein is deemed necessary.

Figure 4:
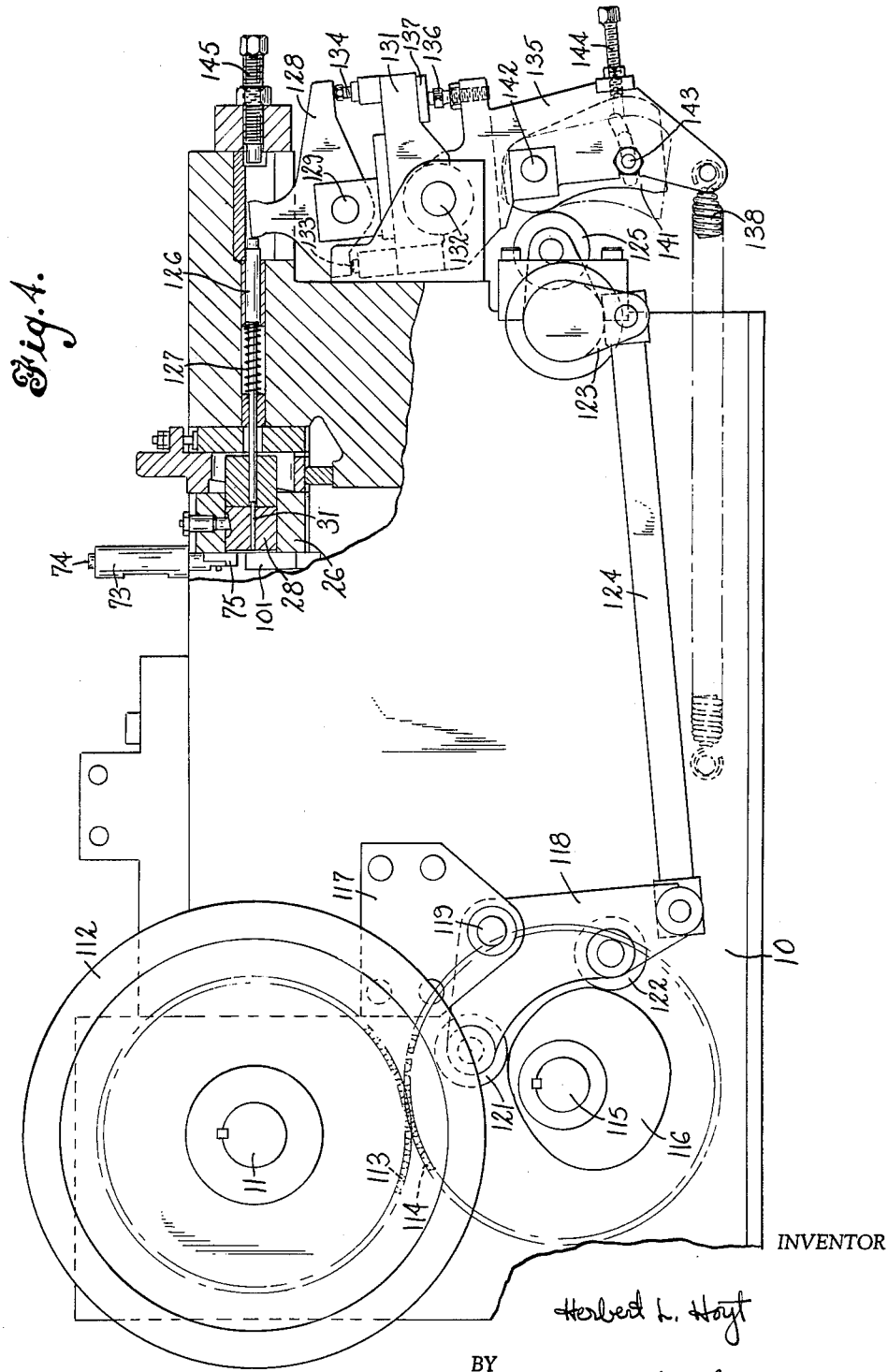
FIG. 4 is a longitudinal view, partly in section, similar to FIG. 2, showing an alternate form of construction of an ejecting mechanism according to the invention.

An alternate construction of the die knock-out mechanism is shown in FIG. 4. FIG. 4 is a view similar to FIG. 2 but only those elements which relate to the die knock-out mechanism are shown. As previously shown, the supporting frame 10 is provided with the crankshaft 11 to which is keyed a flywheel 112 which did not appear in the previous views. A gear 113 keyed to crankshaft 11 meshes with a gear 114 keyed to a shaft 115 journalled in the supporting frame. A cam 116 is also keyed to shaft 115. It will thus be seen that rotation of crankshaft 11 causes cam 116 to be rotated. A support member 117 is secured to frame 10 and a bellcrank lever 118 is pivoted to the support member at 119. A pair of cam follower rollers 121 and 122 are pivotally mounted on the bellcrank lever with the rollers adapted to contact cam 116. A rockable crank 123 is journalled in the frame intermediate its ends. To one end of the rockable crank is pivoted one end of a rod 124 whose other end is pivoted to bellcrank lever 118. A cam follower roller 125 is pivotally mounted on the other end of rockable crank 123.

As described in connection with FIG. 2, the heading die 28 carries a slidably mounted ejecting pin 31 which abuts a knock-out rod 126 slidably mounted in the frame. A spring 127 encircling the knock-out rod may be provided to urge the knock-out rod toward the right as shown in FIG. 4. A lever 128 engages the right end of knock-out rod 126 for advancing the knock-out rod as will be hereafter described. Lever 128 is pivoted at 129 to a second lever 131 which is, in turn, pivoted to the frame at 132. A spring-urged plunger 133 is mounted in lever 131 and acts against lever 128 to urge it in a clockwise direction around pivot 129. The other side of lever 131 carries an adjustable stop 134 which is contacted by lever 128. By means of adjustable stop 134 and plunger 133 the position of lever 128 with respect to lever 131 may be adjusted within limits.

A third lever 135 is also pivoted to the frame at 132 and one side of the third lever abuts lever 131. The other side of the third lever carries an adjustable stop 136 which contacts a frangible plate 137 carried by lever 131. A spring 138 acting between lever 135 and frame 10 urges the lever system in the clockwise direction about pivot 132. A cam 141 is pivoted to lever 135 at 142 and may be secured with relation to lever 135 by means of a bolt 143. An adjustable stop 144 threaded to lever 135 may also be used to set the position of cam 141. The position of the cam surface of cam 141 is such that it is contacted by cam follower roller 125.

The operation of this alternate form of knock-out mechanism may be described as follows. After the workpiece has been headed in die 28 and the gate (FIG. 2) retracts, cam follower roller 122 will approach the high side of cam 116 to rotate bellcrank lever 118 in the counterclockwise direction about pivot 119. This will move rod 124 toward the right thus rotating rockable crank 123 in the counterclockwise direction. Rotation of cam follower roller 125 in contact with cam 141 will cause lever 135 to also be rotated in the counterclockwise direction, thus rotating lever 131 through adjustable stop 136 and frangible plate 137 in the same direction. Through adjustable stop 134, lever 128 will be rotated in a counterclockwise direction, thereby advancing knock-out rod 26 toward the left to clear the die by means of ejecting pin 31. If, upon advancement of knock-out rod 126, jamming of the workpiece occurs, frangible plate 127 will break to prevent damage to the other elements of the knock-out member. As will be readily understood, frangible plate 127 may be readily replaced so that the mechanism may again operate once the die is cleared.

After the die has been cleared, continued rotation of cam 116 will cause the high side to approach cam follower roller 121, thus moving rod 124 toward the left and rotating rockable crank 123 in a clockwise direction. This will allow lever 135 to move in a clockwise direction under the urging of spring 138, thus moving the head of lever 128 in contact with knock-out rod 126 toward the right. The knock-out rod will be retracted from the die cavity by means of spring 127. As indicated above, the position of cam 141 may be adjusted with relation to lever 135 to adjust the amount of advance of the knock-out rod for any particular application. The extremes of adjustment of the cam are shown in FIG. 4 with one position being shown in full lines and the other position being shown in phantom.

It should be noted that the construction described above assures that cam 141 remains in contact with the cam follower roller 125 under the tension of spring 138. If lever 128 becomes jammed on the return stroke or abuts a stop 145 mounted in the frame, lever 128 may float freely with relation to levers 131 and 135 against spring urged plunger 133. In this manner, scuffing of the cam 141 is avoided.

The knock-out mechanism described in connection with FIG. 4 is provided for clearing the workpiece from the heading die. As in the case of the first embodiment of the knock-out mechanisms shown in FIGS. 2 and 3, a knock-out mechanism identical to that shown in FIG. 4 may be provided for clearing the workpiece from the extruding die. In this case, a second cam following roller will be pivotally mounted to rockable crank 123 so that the two knock-out mechanisms will operate in unison by means of operating rod 124.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A header or like mechanism comprising a frame, a die bed mounted on said frame, a die mounted on said bed, a gate reciprocably mounted on said frame, said gate carrying a tool to cooperate with said die, a knock-out rod slidably mounted in said die, a first lever pivoted to said frame and engaging an end of said knock-out rod to operate said rod, a second lever pivoted to said frame, an adjustable arm pivotally attached at one end thereof to said first lever and pivotally attached at the other end thereof to said second lever, a cam follower mounted on said second lever, a cam pivoted to said frame, said cam follower positioned to engage said cam, a pitman arm pivoted at one end to said cam eccentric to the pivot of said cam to said frame, a crankshaft rotatably mounted in said frame, said crankshaft having a crank portion, the other end of said pitman arm being pivoted on said crank portion, and means to rotate said crankshaft in synchronism with the reciprocation of said gate to cause said knock-out rod to clear said die after said gate has caused said tool to cooperate with said die.

2. The structure defined in claim 1 wherein said second lever includes a frangible material that will fracture if an excessive force is applied to said knock-out rod when it is operated to clear said die.

3. The structure defined in claim 1 wherein said second lever is constructed having two halves, said first and second halves being coaxially pivoted to said frame, said first half carrying said cam follower, said second half connected to said first lever through said adjustable arm, each of said halves having outwardly extending ends adapted to abut each other when each of said halves is urged in opposite rotational directions about said pivot, a pin adjustably mounted in said second half and extending toward said first half in a plane perpendicular to said pivot, a breaker plate of frangible material mounted to said first half, said pin engaging said breaker plate to urge said outwardly extending ends to abut each other whereby said halves will act as a unitary lever when normal amounts of pressure are applied by the cam through said levers to said knock-out pin, said breaker plate adapted to fracture under excessive pressure to permit the extending ends of said second lever to rotate away from each other to remove the pressure applied to said knock-out rod by said levers regardless of the reciprocation of said cam.

4. A header or like mechanism comprising a frame, a crankshaft rotatably mounted in said frame, means to rotate said crankshaft, a die bed mounted on said frame, a die mounted on said die bed, a gate reciprocably mounted on said frame for operation by said crankshaft, said gate carrying a tool to cooperate with said die, a knock-out rod slidably mounted in said die, a first lever engaging an end of said knock-out rod to advance said rod within the die, a second lever pivoted to said frame, said first lever being pivoted to said second lever, means to adjust the angular position of said first lever relative to said second lever, a cam adjustably mounted to said second lever, a spring acting between said second lever and said frame to urge said first and second levers toward a position to permit retraction of said knock-out rod, a first crank rockably mounted on said frame, a cam follower mounted on said first crank, said cam follower adapted to engage the surface of said cam, an operating rod pivoted at one end to said first crank, a second crank pivoted to said frame, said operating rod being pivoted at its other end to said second crank, an operating cam journalled in said frame in driving relationship with said crankshaft, and means on said second crank for rocking said second crank in response to the changing profile of said operating cam.

5. The structure defined in claim 4 and further including means to adjust the position of said cam relative to said second lever.

6. The structure defined in claim 4 wherein said second lever includes a frangible material that will fracture if an excessive force is applied to said knock-out rod when it is operated to clear said die.

7. The structure defined in claim 4 wherein said second lever is constructed having two halves, said first and second halves being coaxially pivoted to said frame, said first half carrying said cam, said second half carrying said first lever pivoted thereto, each of said halves having outwardly extended ends adapted to abut each other when each of said halves is urged in opposite rotational directions about said pivot, a pin adjustably mounted in said second half and extending toward said first half in a plane perpendicular to said pivot, and a breaker plate of frangible material mounted to said first half, said pin engaging said breaker plate to urge said outwardly extending ends to abut each other.

8. A header or like mechanism comprising a frame, a crankshaft rotatably mounted in said frame, means for rotating said crankshaft, a die bed mounted on said frame, a die mounted on said die bed, a gate reciprocably mounted on said frame for operation by said crankshaft, said gate carrying a tool to cooperate with said die, a knock-out rod slidably mounted in said die, a first lever pivoted to said frame and engaging an end of said knock-out rod to advance said rod within said die, a second lever pivoted to said frame, said first lever being pivoted to said second lever, means to adjust the angular position of said first lever relative to said second lever, a single cam means coupled to said frame, a cam follower means coupled to said single cam means for providing the movement of said second lever in two directions, a shaft journalled in said frame, means to rotate said shaft in synchonism with said crankshaft and means for moving said single cam means in response to rotation of said shaft.

9. A header or like mechanism comprising a frame, a crankshaft rotatably mounted in said frame, means to rotate said crankshaft, a die bed mounted on said frame, a die mounted on said die bed, a gate reciprocably mounted on said frame for operation by said crankshaft, said gate carrying a tool to cooperate with said die, a knock-out rod slidably mounted in said die, a lever pivoted to said frame and engaging an end of said knock-out rod to advance said rod within the die, a cam adjustably mounted to said lever, a spring acting between said lever and said frame to urge said lever toward a position to permit retraction of said knock-out rod, a first crank rockably mounted on said frame, a cam follower mounted on said first crank, said cam follower adapted to engage the surface of said cam, an operating rod pivoted at one end to said first crank, a second crank pivoted to said frame, said operating rod being pivoted at its other end to said second crank, a single operating cam journalled in said frame in driving relationship with said crankshaft, and means on said second crank for rocking said crank in response to only the changing profile of said single operating cam, said lever includes a frangible material that will fracture if an excessive force is applied to said knock-out rod when it is operated to clear said die.

References Cited by the Examiner

UNITED STATES PATENTS

| | | | |
|---|---|---|---|
| 1,592,060 | 7/1926 | Wilcox | 10—11 |
| 2,038,543 | 3/1934 | Clouse | 10—11 |
| 2,069,511 | 2/1937 | Wilcox | 10—12 |
| 2,139,936 | 12/1938 | Clouse | 10—25 |
| 2,338,330 | 1/1944 | Huebner | 10—25 |
| 2,542,864 | 2/1951 | Friedman | 10—25 |
| 2,741,132 | 4/1956 | Goldberg | 74—54 |

CHARLES W. LANHAM, *Primary Examiner.*

WILLIAM J. STEPHENSON, *Examiner.*